(12) United States Patent
Smelyansky et al.

(10) Patent No.: US 8,713,664 B2
(45) Date of Patent: Apr. 29, 2014

(54) DETECTING THE TYPE OF NAT FIREWALL USING MESSAGES

(75) Inventors: Vladimir Smelyansky, Glenview, IL (US); Victor Grinberg, Buffalo Grove, IL (US)

(73) Assignee: Xcast Labs, Inc., Northfield, IL (US)

(*) Notice: Subject to any disclaimer, the term of this patent is extended or adjusted under 35 U.S.C. 154(b) by 102 days.

(21) Appl. No.: 12/709,963

(22) Filed: Feb. 22, 2010

(65) Prior Publication Data
US 2010/0218246 A1  Aug. 26, 2010

Related U.S. Application Data

(60) Provisional application No. 61/154,509, filed on Feb. 23, 2009.

(51) Int. Cl.
*H04L 29/06* (2006.01)
*G06F 15/167* (2006.01)
*G06F 15/173* (2006.01)
*G06F 15/16* (2006.01)

(52) U.S. Cl.
CPC .................................. *H04L 63/029* (2013.01)
USPC ............. 726/11; 709/218; 709/224; 709/225; 709/227

(58) Field of Classification Search
CPC .................................................... H04L 63/029
See application file for complete search history.

(56) References Cited

U.S. PATENT DOCUMENTS

| | | | |
|---|---|---|---|
| 2005/0074031 A1* | 4/2005 | Sunstrum | 370/493 |
| 2006/0085548 A1* | 4/2006 | Maher et al. | 709/227 |
| 2006/0272013 A1* | 11/2006 | Kilgore | 726/11 |
| 2007/0157303 A1* | 7/2007 | Pankratov | 726/11 |
| 2007/0198710 A1* | 8/2007 | Gopalakrishnan | 709/225 |
| 2007/0214262 A1* | 9/2007 | Buchbinder et al. | 709/224 |
| 2008/0080532 A1* | 4/2008 | O'Sullivan et al. | 370/401 |
| 2008/0159146 A1* | 7/2008 | Claudatos et al. | 370/235 |
| 2008/0281943 A1* | 11/2008 | Shapiro | 709/218 |
| 2010/0146099 A1* | 6/2010 | Lin et al. | 709/224 |

OTHER PUBLICATIONS

International Search Report issued in PCT/US2010/025046, dated Apr. 19, 2010.

* cited by examiner

*Primary Examiner* — Shin-Hon Chen
(74) *Attorney, Agent, or Firm* — Smith, Gambrell & Russell, LLP

(57) ABSTRACT

A method, system, and computer program product for detecting the type of NAT firewall using messages provides the capability to determine the type of NAT in use without requiring special purpose hardware or software. A method for determining a type of a NAT firewall may comprise receiving a message from a device inside the NAT firewall, the message addressed to a first IP address and port of a device outside the NAT firewall, transmitting a plurality of messages to the device inside the NAT firewall, at least one of the plurality of messages addressed from the first IP address and port and at least one of the messages addressed from a second IP address and port, receiving responses to at least some of the plurality of messages transmitted to the device inside the NAT firewall and determining the type of the NAT firewall based on the received responses.

21 Claims, 3 Drawing Sheets

DETECTING THE TYPE OF NAT FIREWALL USING MESSAGES

CROSS-REFERENCE TO RELATED APPLICATIONS

This application claims the benefit of Provisional Application No. 61/154,509, filed Feb. 23, 2009, the contents of which are incorporated herein in their entirety.

BACKGROUND OF THE INVENTION

1. Field of the Invention

The present invention relates to a method, system, and computer program product for detecting a type of NAT (Network Address Translators) Firewall by utilizing SIP messages.

2. Description of the Related Art

RFC 3489 defines Simple Traversal of User Datagram Protocol through Network Address Translators (NATs) (STUN), which is a collection of methods, including a network protocol, used in NAT traversal for applications of real-time voice, video, messaging, and other interactive IP communications. The STUN protocol allows applications operating through a NAT to discover the presence of a NAT and to obtain the mapped (public) IP address (NAT address) and port number that the NAT has allocated for the application's User Datagram Protocol (UDP) connections to remote hosts. The protocol requires assistance from a 3rd-party network server (STUN server) located on the opposing (public) side of the NAT, usually the public Internet. The original version of the protocol also specified methods to ascertain the specific type of NAT, but those methods have been deprecated in the newer specification (RFC 5389), because of the plethora of specific NAT implementation behavior in various networking equipment and the resulting intractability of the problem and the deficiencies of the method used the original specification. As a result, a need arises for a technique by which a NAT type can be successfully determined and which does not require the use of special hardware.

SUMMARY OF THE INVENTION

A method, system, and computer program product for detecting the type of NAT firewall using messages provides the capability to determine the type of NAT in use without requiring special purpose hardware or software at a user's premises. The present technology has a number of advantages over conventional techniques, such as the STUN technology. For example, the present technology work works with any SIP client (hardware or software) that is compliant with RFC 3261, and no additional functionality (such as STUN client support) is required from a client. The determined information about the type of NAT Firewall belongs to the SBC, which is in contrast to the STUN technique, in which the information remains on the client side located behind the firewall. This is important because, in many cases, even if the client has correct information about the type of firewall, the client by itself may not handle SIP sessions (conversations) correctly. By contrast, when SBC has knowledge about the type of firewall, the SBC can take appropriate action to ensure correct handling of SIP sessions, because the SBC has full control of SIP/RTP flow. Finally, the present technology provides more accurate results than convention techniques because the SBC collects and analyzes more information than do conventional techniques.

For example, a method for determining a type of a NAT firewall may comprise receiving a message from a device inside the NAT firewall, the message addressed to a first IP address and port of a device outside the NAT firewall, transmitting a plurality of messages to the device inside the NAT firewall, at least one of the plurality of messages addressed from the first IP address and port and at least one of the messages addressed from a second IP address and port, receiving responses to at least some of the plurality of messages transmitted to the device inside the NAT firewall and determining the type of the NAT firewall based on the received responses. The NAT firewall may be an IP phone or ATA device. The message received from the device inside the NAT firewall may be a SIP REGISTER message. At least one of the plurality of messages transmitted to the device inside the NAT firewall may be a SIP OPTIONS message.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

A method, system, and computer program product for detecting the type of Network Address Translation (NAT) firewall using messages provides the capability to determine the type of NAT in use without requiring special purpose hardware or software at a user's premises.

Figure 1:
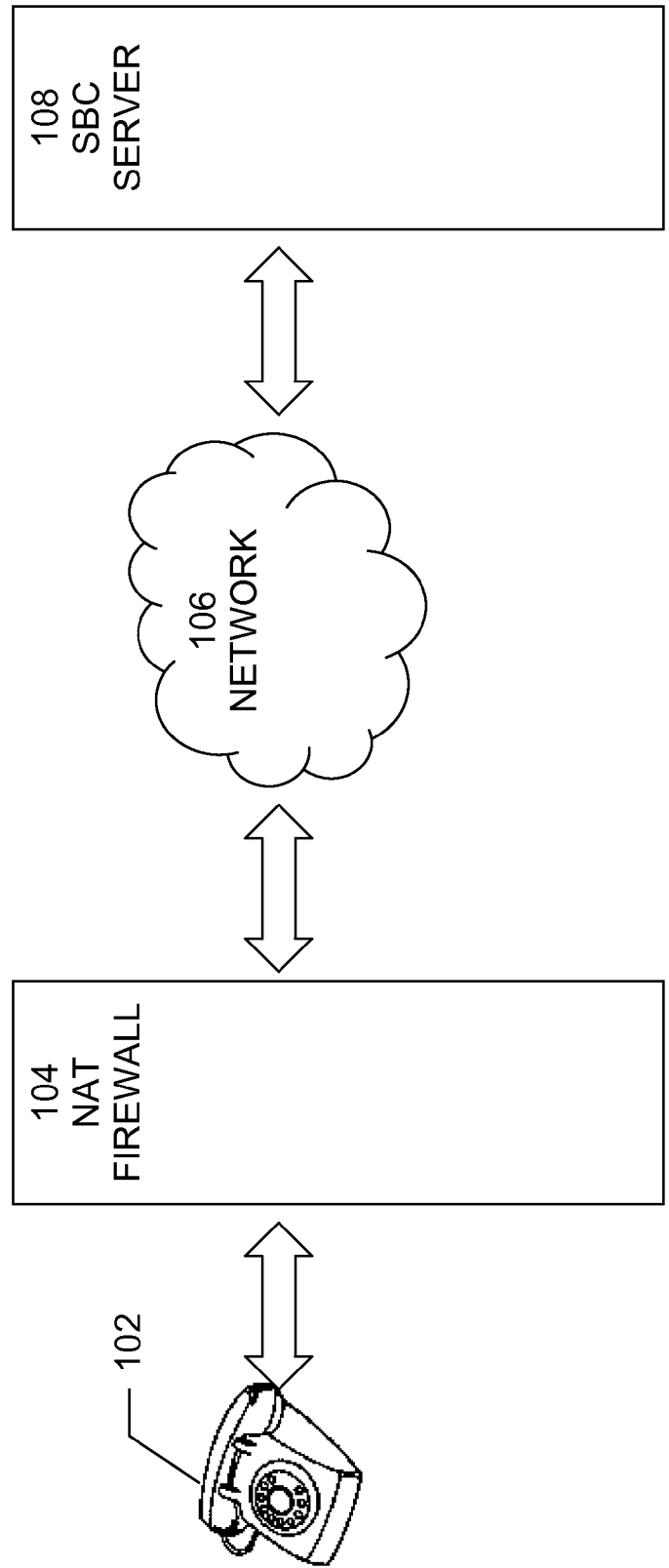
FIG. 1 is an exemplary diagram of block diagram of a network system in which the present invention may be implemented.

As an example, such features may be provided in a network system 100, such as that shown in FIG. 1. FIG. 1 shows an IP Phone or ATA device 102, a NAT Firewall 104, a network 106, and SBC (Session Border Controller) Server 108. IP Phone or Analog Telephone Adapter (ATA) device 102 is located at a private IP address on a network located behind NAT Firewall 104. An IP Phone or ATA device is used as an example in this description. However, any device capable of transmitting and receiving SIP messages may be used to implement the present invention. NAT Firewall 104 performs modifies network address information in datagram (IP) packet headers for packets that transit across NAT Firewall 104. This provides the capability of remapping a given address space into another. In particular, in the example shown in FIG. 1, NAT Firewall 104 modifies network address information in packets that are communicated between IP Phone or ATA device 102 and network 106. Network 106 typically is, or includes the Internet, but may include any communications network that is now in service or which may be developed in the future. Such a network may include one or more public or private communications networks, such as the Internet, wired or wireless telephone networks, wired or wireless data networks, local area networks, etc. SBC Server 108 is a device used in Voice over Internet Protocol (VoIP) networks to control the signaling and media streams involved in setting up, conducting, and tearing down telephone calls or other interactive media communications.

Figure 2:
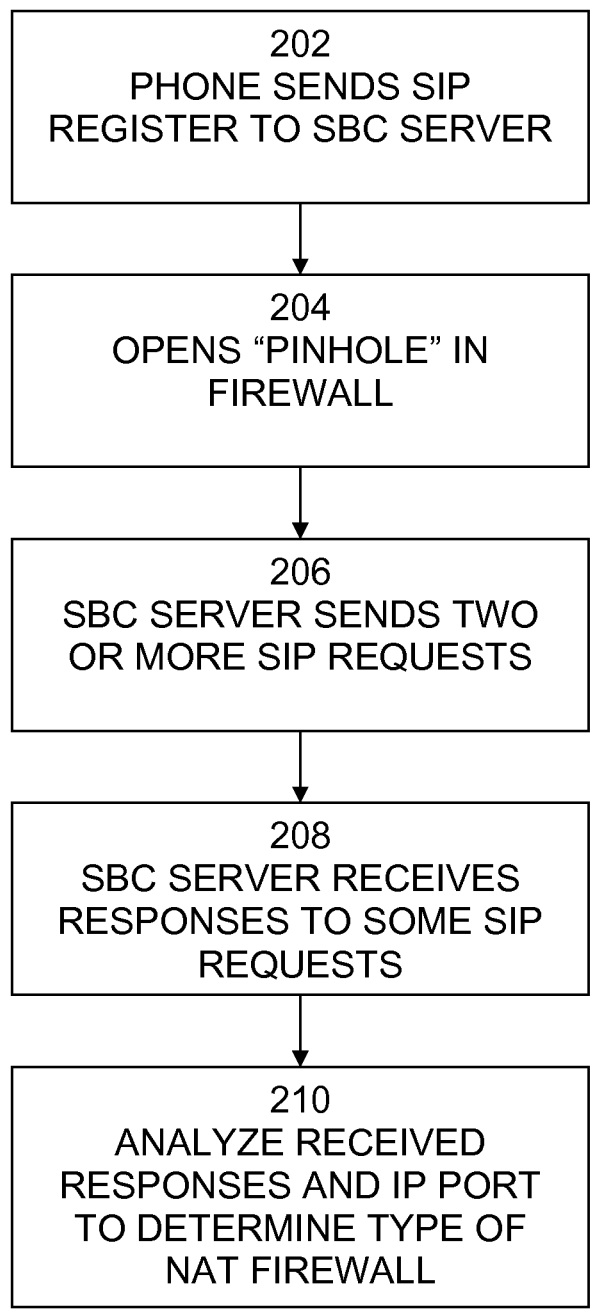
FIG. 2 is an exemplary flow diagram of a process of process of NAT type determination

An exemplary flow diagram of a process 200 of NAT type determination is shown in FIG. 2. It is best viewed in conjunction with FIG. 1. Process 200 begins with step 202, in which IP Phone or ATA device 102 initializes and sends a SIP REGISTER message to a pre-configured address in SBC Server 108. The SIP REGISTER message is sent through NAT Firewall 104 and via network 106. Because message is sent from inside the firewall to outside the firewall (from Private network to Public network) NAT Firewall 104 does not block the message. An example of a SIP REGISTER message sent from IP Phone or ATA device 102 is:

```
REGISTER sip:office.atlanta.com SIP/2.0
Via: SIP/2.0/UDP 10.0.0.127:8060;branch=z9hG4bKtwazbrvv
From: "alice" <sip:210S01@office.atlanta.com>;tag=lateq
To: <sip:210S01@office.atlanta.com>
Call-ID: rnueyppsbsinivj
CSeq: 162 REGISTER
Contact: <sip:210S01@10.0.0.127:8060;transport=udp>;expires=3600
User-Agent: Softphone/1.5
Content-Length: 0
```

In step 204, the sending of the SIP REGISTER message through NAT Firewall 104 opens a "pinhole" in NAT Firewall 104, which allows SBC Server to send response back to IP Phone. This pinhole may be used to send requests from SBC Server 108 to IP Phone IP Phone or ATA device 102.

In step 206, SBC Server 108 sends two or more SIP requests to IP Phone or ATA device 102. Each SIP request uses a different source IP address and/or port number of SBC Server 108. At least one of the requests is sent through the pinhole (from the same IP address and port number of SBC Server 108 to which the original SIP REGISTER message was sent). In addition, at least one of the requests is sent from a different IP address and port number of SBC Server 108. Any SIP request may be used, but preferably SIP OPTIONS messages are used. The important aspect is that the SIP request is formed so that when IP Phone or ATA device 102 responds to the request, the response is sent to different IP addresses and/or port numbers of SBC Server 108 than that to which the original SIP REGISTER message was sent. At least one of the requests will definitely reach IP Phone because the request was sent from the same IP address and port number of SBC Server 108 to which the original SIP REGISTER message was sent. In this case, the NAT firewall 104 will not block the request, regardless of the type of the NAT firewall 104. The other request or requests may or may not be blocked by NAT firewall 104, depending on the type of NAT firewall 104. An example of SIP OPTIONS message sent through the pinhole (from the same IP address and port number of SBC Server 108 to which the original SIP REGISTER message was sent):

```
OPTIONS sip:210S01@10.0.0.127:8060 SIP/2.0
Via: SIP/2.0/UDP sec.atlanta.com:7061;branch=z9hG4bK-opt-76718
From: "SBC" <sip:sbc@atlanta.com>;tag=a799
To: "alice" <sip:210S01@office.atlanta.com>
Call-ID: 1.76718@atlanta.com
CSeq: 5 OPTIONS
User-Agent: SBC
Content-Length: 0
```

An example of SIP OPTIONS message that is sent not through the pinhole (from a different IP address and port number of SBC Server 108 than that to which the original SIP REGISTER message was sent):

```
OPTIONS sip:210S01@10.0.0.127:8060 SIP/2.0
Via: SIP/2.0/UDP sec.atlanta.com:7061;branch=z9hG4bK-opt-91176
From: "SBC" <sip:sbc@atlanta.com>;tag=8kv4
To: "alice" <sip:210S01@office.atlanta.com>
Call-ID: 2.91176@atlanta.com
CSeq: 5 OPTIONS
User-Agent: SBC
Content-Length: 0
```

As a result, in step 208, SBC Server 108 receives responses to some of the requests that were sent to IP Phone or ATA device 102. In step 210, the received responses to the SIP requests and the source IP address and port number from which the returned SIP responses were received are analyzed to determine the type of NAT firewall 104 that is in use.

There are different pieces of information collected by SBC Server 108 in order to determine the type of NAT firewall 104 that is in use. For example, when IP Phone or ATA device 102 originally sends the SIP REGISTER message to SBC Server 108 (in step 202 ), it provides in the SIP header "Contact:" information. This information includes the location of IP Phone or ATA device 102 on the private network, including the IP address and port. By comparing that port with the source, from which the SIP message was received, SBC Server 108 can detect the ability of NAT firewall 104 to preserve internal ports for external connection.

Analyzing the source IP address and port of the responses received by SBC Server 108 in step 208 provides valuable information. For example, if response arrived from a different port than that from which the original SIP message was sent (step 202), then SBC Server 108 may conclude that NAT firewall 104 is of a symmetric type (as defined in RFC 3489). By contrast, when the response came from the same port, SBC Server 108 may conclude that NAT firewall 104 is one of many types: Full Cone, Port Restricted Cone, IP Restricted Cone, etc.

To further distinguish one of the above-mentioned firewall types, SBC Server 108 sends additional SIP messages (step 206) to the client not through the existing "pinhole", that is, from another IP address and port pair. Each of these messages may or may not be blocked by NAT firewall 104. If NAT firewall 104 does not block the message and passes it to IP Phone or ATA device 102, IP Phone or ATA device 102 would respond back to SBC Server 108. Receipt of the response would let SBC Server 108 conclude that NAT firewall 104 is of type Full Cone, for example. If SBC Server 108 doesn't receive the SIP response back from IP Phone or ATA device 102, it means that NAT firewall 104 not of the Full Cone type. In that case, SBC Server 108 may receive an Internet Control Message Protocol (ICMP) message. If SBC Server 108 didn't receive an ICMP message, SBC Server 108 concludes that that NAT firewall 104 is of one of the Restricted Cone types. If SBC Server 108 did receive an ICMP message, SBC Server 108 analyzes the information in the IMCP message. Depending whether or not the ICMP message contains a reference to the message from SBC Server 108 that triggered the ICMP response, SBC Server 108 determines the behavior of NAT firewall 104, so that SBC Server 108 can provide services. These different firewall behaviors do not have a common name specified in RFC3489, but determination of the behavior is important for SBC Server 108 to provide appropriate services.

Figure 3:
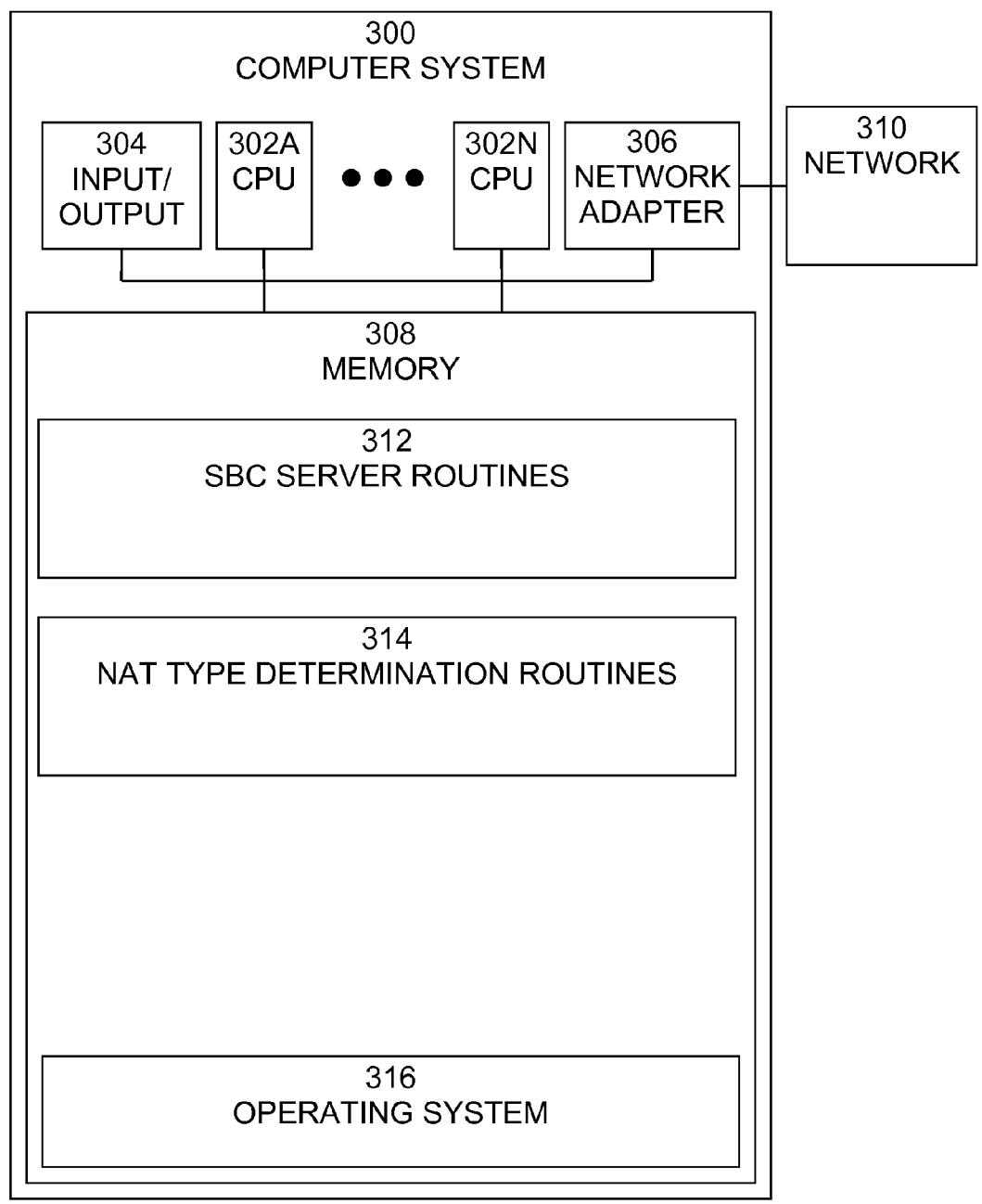
FIG. 3 is an exemplary block diagram of a computer system, such as an SBC Server, in which the present invention may be implemented.

An exemplary block diagram of a computer system 300, such as an SBC Server, is shown in FIG. 3. System 300 is typically a programmed general-purpose computer system, such as a personal computer, workstation, server system, and minicomputer or mainframe computer. System 300 includes one or more processors (CPUs) 302A-302N, input/output circuitry 304, network adapter 306, and memory 308. CPUs 302A-302N execute program instructions in order to carry out the functions of the present invention. Typically, CPUs 302A-302N are one or more microprocessors, such as an INTEL PENTIUM® processor. FIG. 3 illustrates an embodiment in which System 300 is implemented as a single multiprocessor computer system, in which multiple processors 302A-302N share system resources, such as memory 308, input/output circuitry 304, and network adapter 306. However, the present invention also contemplates embodiments in which system 300 is implemented as a plurality of networked computer systems, which may be single-processor computer systems, multi-processor computer systems, or a mix thereof.

Input/output circuitry 304 provides the capability to input data to, or output data from, database/system 300. For example, input/output circuitry may include input devices, such as keyboards, mice, touchpads, trackballs, scanners, etc., output devices, such as video adapters, monitors, printers, etc., and input/output devices, such as, modems, etc. Network adapter 306 interfaces device 300 with network 310. Network 310 includes any communications network that is now in service or which may be developed in the future. Such a network may include one or more public or private communications networks, such as the Internet, wired or wireless telephone networks, wired or wireless data networks, local area networks, etc.

Memory 308 stores program instructions that are executed by, and data that are used and processed by, CPU 302 to perform the functions of system 300. Memory 308 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface, or Serial AT Attachment (SATA), or a variation or enhancement thereof.

The contents of memory 308 varies depending upon the function that system 300 is programmed to perform. For example, where system 300 is an SBC Server, memory 308 includes SBC Server routines 312, which implement conventional SBC server functionality. In addition, memory 308 includes NAT Type determination routines 314, which implements the SBC server functionality needed to perform the NAT Type determination process shown in FIG. 2. Operating system 316 provides overall system functionality.

As shown in FIG. 3, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable storage media include, floppy disks, hard disk drives, CD-ROMs, DVDROMs, RAM, flash memory, etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for determining a type of a Network Address Translation (NAT) firewall at a system outside the NAT firewall comprising:

receiving at the system outside the NAT firewall a Session Initiation Protocol (SIP) message from a device inside the NAT firewall, the SIP message addressed to a first IP address and port of the system outside the NAT firewall;

transmitting a plurality of SIP messages to the device inside the NAT firewall, at least one of the plurality of SIP messages addressed from the first IP address and port of the system outside the NAT firewall and at least one of the SIP messages addressed from a second IP address and port of the system outside the NAT firewall, wherein each SIP message is formed so that when the device inside the NAT firewall responds to the SIP message, the response is sent to a different IP address and port of the system outside the NAT firewall than the first IP address and port;

receiving responses at the system outside the NAT firewall to at least some of the plurality of SIP messages transmitted to the device inside the NAT firewall; and determining at the system outside the NAT firewall the type of the NAT firewall based on the received responses, which responses are received to SIP messages addressed from the second IP address and port of the system outside the NAT firewall, and which responses are received addressed to the IP address and port of the system outside the NAT firewall that is different than the first IP address and port.

2. The method of claim 1, wherein the device inside the NAT firewall is a SIP IP phone, SIP ATA device or other SIP-compliant client.

3. The method of claim 1, wherein the SIP message received from the device inside the NAT firewall is a SIP REGISTER or SIP INVITE message.

4. The method of claim 1, wherein at least one of the plurality of SIP messages transmitted to the device inside the NAT firewall is a SIP OPTIONS message.

5. The method of claim 1, wherein each of the plurality of transmitted SIP messages may be blocked or may not be blocked by the NAT firewall depending on the type of the NAT firewall.

6. The method of claim 5, wherein whether or not a response is received depends on whether or not the NAT firewall blocked a transmitted SIP message.

7. The method of claim 6, wherein the type of the NAT firewall is determined based on a source IP address and port of at least one received SIP message and on which of the plurality of transmitted SIP messages responses were received for.

8. A computer program product for determining a type of a Network Address Translation (NAT) firewall at a system outside the NAT firewall, the computer program product comprising a non-transitory computer readable storage medium and computer program instructions, recorded on the computer readable medium and executable by a processor of the system, for performing the steps of:

receiving at the system outside the NAT firewall a Session Initiation Protocol (SIP) message from a device inside the NAT firewall, the SIP message addressed to a first IP address and port of the system outside the NAT firewall;

transmitting a plurality of SIP messages to the device inside the NAT firewall, at least one of the plurality of SIP messages addressed from the first IP address and port of the system outside the NAT firewall and at least one of the SIP messages addressed from a second IP address and port of the system outside the NAT firewall, wherein each SIP message is formed so that when the device inside the NAT firewall responds to the SIP message, the response is sent to a different IP address and port of the system outside the NAT firewall than the first IP address and port;

receiving responses at the system outside the NAT firewall to at least some of the plurality of SIP messages transmitted to the device inside the NAT firewall; and determining at the system outside the NAT firewall the type of the NAT firewall based on the received responses, which responses are received to SIP messages addressed from the second IP address and port of the system outside the NAT firewall, and which responses are received addressed to the IP address and port of the system outside the NAT firewall that is different than the first IP address and port.

9. The computer program product of claim 8, wherein the device inside the NAT firewall is a SIP IP phone, SIP ATA device or other SIP-compliant client.

10. The computer program product of claim 8, wherein the SIP message received from the device inside the NAT firewall is a SIP REGISTER or SIP INVITE message.

11. The computer program product of claim 8, wherein at least one of the plurality of SIP messages transmitted to the device inside the NAT firewall is a SIP OPTIONS message.

12. The computer program product of claim 8, wherein each of the plurality of transmitted SIP messages may be blocked or may not be blocked by the NAT firewall depending on the type of the NAT firewall.

13. The computer program product of claim 12, wherein whether or not a response is received depends on whether or not the NAT firewall blocked a transmitted SIP message.

14. The computer program product of claim 13, wherein the type of the NAT firewall is determined based on a source IP address and port of at least one received SIP message and on which of the plurality of transmitted SIP messages responses were received for.

15. A system for determining a type of a Network Address Translation (NAT) firewall, the system outside the NAT firewall, comprising a processor operable to execute computer program instructions, a memory operable to store computer program instructions executable by the processor, and computer program instructions stored in the memory and executable to perform the steps of:

receiving at the system outside the NAT firewall a Session Initiation Protocol (SIP) message from a device inside the NAT firewall, the SIP message addressed to a first IP address and port of the system outside the NAT firewall;

transmitting a plurality of SIP messages to the device inside the NAT firewall, at least one of the plurality of SIP messages addressed from the first IP address and port of the system outside the NAT firewall and at least one of the SIP messages addressed from a second IP address and port of the system outside the NAT firewall, wherein each SIP message is formed so that when the device inside the NAT firewall responds to the SIP message, the response is sent to a different IP address and port of the system outside the NAT firewall than the first IP address and port;

receiving responses at the system outside the NAT firewall to at least some of the plurality of SIP messages transmitted to the device inside the NAT firewall; and determining at the system outside the NAT firewall the type of the NAT firewall based on the received responses, which responses are received to SIP messages addressed from the second IP address and port of the system outside the NAT firewall, and which responses are received addressed to the IP address and port of the system outside the NAT firewall that is different than the first IP address and port.

16. The system of claim 15, wherein the device inside the NAT firewall is a SIP IP phone, SIP ATA device or other SIP-compliant client.

17. The system of claim 15, wherein the SIP message received from the device inside the NAT firewall is a SIP REGISTER or SIP INVITE message.

18. The system of claim 15, wherein at least one of the plurality of SIP messages transmitted to the device inside the NAT firewall is a SIP OPTIONS message.

19. The system of claim 15, wherein each of the plurality of transmitted SIP messages may be blocked or may not be blocked by the NAT firewall depending on the type of the NAT firewall.

20. The system of claim 19, wherein whether or not a response is received depends on whether or not the NAT firewall blocked a transmitted SIP message.

21. The system of claim 20, wherein the type of the NAT firewall is determined based on a source IP address and port of at least one received SIP message and on which of the plurality of transmitted SIP messages responses were received for.

* * * * *